United States Patent [19]

Hayakawa

[11] Patent Number: 4,855,780
[45] Date of Patent: Aug. 8, 1989

[54] PHOTOMETRIC DEVICE FOR PSEUDO FORMAT CAMERA

[75] Inventor: Shingo Hayakawa, Yokohama, Japan
[73] Assignee: Canon Kabushiki Kaisha, Tokyo, Japan
[21] Appl. No.: 195,820
[22] Filed: May 19, 1988
[51] Int. Cl.⁴ .............................. G03B 7/08
[52] U.S. Cl. .................................... 354/432
[58] Field of Search .............................. 354/429–434, 354/481, 105, 106

[56] References Cited

U.S. PATENT DOCUMENTS

| | | | |
|---|---|---|---|
| 3,091,162 | 5/1963 | Stinson | 354/481 |
| 3,450,016 | 6/1969 | Yamada | 354/432 |
| 3,529,523 | 9/1970 | Haskell | 354/432 X |
| 3,762,286 | 10/1973 | Hasegawa | 354/432 |
| 4,306,787 | 12/1981 | Fukuhara et al. | 354/432 |
| 4,395,099 | 7/1983 | Terasita | 354/430 |
| 4,445,778 | 5/1984 | Nakauchi | 354/432 X |
| 4,534,639 | 8/1985 | Konishi et al. | 354/481 X |
| 4,636,054 | 1/1987 | Saegusa | 354/432 |
| 4,639,111 | 1/1987 | Harvey | 354/481 |
| 4,774,401 | 9/1988 | Yamada et al. | 354/432 X |

FOREIGN PATENT DOCUMENTS

| 123030 | 9/1979 | Japan | 354/432 |
|---|---|---|---|
| 102838 | 8/1981 | Japan | 354/432 |

*Primary Examiner*—W. B. Perkey
*Attorney, Agent, or Firm*—Fitzpatrick, Cella, Harper & Scinto

[57] ABSTRACT

A photometric device for a pseudo format camera capable of performing trimming photography includes, a trimming data setting unit which sets trimming data. A light-receiving unit consists of a plurality of light-receiving portions for splitting an objective field into a plurality of regions and obtaining luminance data of the plurality of regions. An arithmetic unit calculates a photometric value using the plurality of luminance data. The computing unit includes a correction circuit for substantially correcting luminance data of only a specific region in accordance with trimming data from the trimming data setting unit.

22 Claims, 10 Drawing Sheets

| 42a | 42b | 42c | 42d | 42e |
|-----|-----|-----|-----|-----|
| 42f | 42g | 42h | 42i | 42j |
| 42k | 42l | 42m | 42n | 42o |
| 42p | 42q | 42r | 42s | 42t |
| 42u | 42v | 42x | 42y | 42z |

FIG. 18

| TRIMMING INFORMATION (%) | | OUTPUT OF INFORMATION SETTING MEANS | | | | OUTPUT OF AND GATE | | | | | | | | | | | | ADD TO THE CALCULATION OF PHOTOMETRING OR NOT | | | | | | | |
|---|---|---|---|---|---|---|---|---|---|---|---|---|---|---|---|---|---|---|---|---|---|---|---|---|
| | | FIG.14 | | FIG.15 | | FIG. 14 | | | | FIG. 15 | | | | | | | | RIGHT AND LEFT DIRECTION (LINE) | | | | UP AND DOWN DIRECTION (COLUMN) | | | |
| UP AND DOWN | RIGHT AND LEFT | $P_1/F$ | $P_2/F$ | $Q_1/F$ | $Q_2/F$ | 13 | 14 | 15 | 16 | 24 | 25 | 26 | 27 | | | | | 1 m | 2 m-1 | 3 m-2 | 4~ m-3 | 1 n | 2 n-1 | 3 n-2 | 4~ n-3 |
| (i) 100 | 100 | H | H | H | H | H | L | L | L | H | L | L | L | | | | | O | O | O | O | O | O | O | O |
| (ii) a | a | H | L | H | H | L | H | L | L | L | H | L | L | | | | | X | O | O | O | X | O | O | O |
| (iii) b | b | L | H | L | L | L | L | H | L | L | L | H | L | | | | | X | X | O | O | X | X | O | O |
| (iv) c | c | L | L | L | L | L | L | L | H | L | L | L | H | | | | | X | X | X | O | X | X | X | O |
| (v) 100 | a | H | H | H | H | H | L | L | L | L | H | L | L | | | | | O | O | O | O | X | O | O | O |
| (vi) 100 | c | H | H | H | H | H | L | L | L | H | L | L | H | | | | | O | O | O | O | X | X | X | O |
| (vii) b | 100 | H | L | H | H | L | H | L | L | L | L | L | L | | | | | X | X | O | O | O | O | O | O |
| (viii) c | a | L | L | H | H | L | L | L | H | H | L | L | L | | | | | X | X | X | X | X | O | O | O |

4,855,780

PHOTOMETRIC DEVICE FOR PSEUDO FORMAT CAMERA

BACKGROUND OF THE INVENTION

1. Field of the Invention

The present invention relates to a photometric device for a pseudo format camera capable of performing trimming photography.

2. Related Background Art

A new principle of telescopic photography, a so-called pseudo format camera, has been proposed. As described in U.S. Pat. Nos. 4,650,304, 4,652,104, 4,647,170, etc., a portion (central portion) of a negative film is designated before photography, and is enlarged during printing without using a telescopic lens, so that there is little difference between a printed image obtained by this method and one obtained using a telescopic lens. In the following description, photography according to this principle will be referred to as trimming photography.

A pseudo format camera poses a photometric problem. In the pseudo format camera, a photometric method is not particularly changed between a normal photographing mode and a trimming photographing mode, and a photometric value is obtained from the luminance of the entire region of a field in both the modes.

Therefore, in the normal photographing mode, there is no problem. However, in the trimming photographing mode, if a high-luminance object (e.g., sun) or low-luminance object (e.g., ground) is present outside an enlarged printing region, appropriate exposure cannot be provided to an object region.

In order to solve the above problem, Japanese Patent Laid-Open Applications (Kokai) Nos. 62-50737 and 62-112139 have been proposed. In the former improved proposal, a photometric field angle (fixed) in a photometric optical system in a photometric means is set to be smaller than a photographic field angle of a trimming range when trimming photography is performed. Thus, an exposure error is suppressed in the trimming photographing mode. In the latter proposal, a lens in a photometric optical system is drive-controlled to be capable of focusing. Thus, in the trimming photographing mode, a photometric field angle is decreased compared to that in the normal photographing mode, so that exposure error is suppressed in both the normal and trimming photographing modes.

As another principle, U.S. Pat. No. 4,639,111 has also been proposed. In this proposal, a mask member with a variable mask region is arranged in front (in an optical sense) of a sensor in a photometric means. In the trimming photographing mode, the mask region of the mask member is varied in correspondence with the setting of a trimming range, so that an exposure error is suppressed in both the normal and trimming photographing modes.

SUMMARY OF THE INVENTION

It is an object of the present invention to provide a photometric device which can suppress an exposure error in both normal and trimming photographing modes with lower cost and with a more compact size than the conventional proposals.

BRIEF DESCRIPTION OF THE DRAWINGS

FIG. 18 is a view showing a circuit operation in the trimming photographing mode shown in FIG. 17.

DESCRIPTION OF THE PREFERRED EMBODIMENTS

Embodiments of the present invention are described hereinafter with reference to the accompanying drawings.

Figure 1:
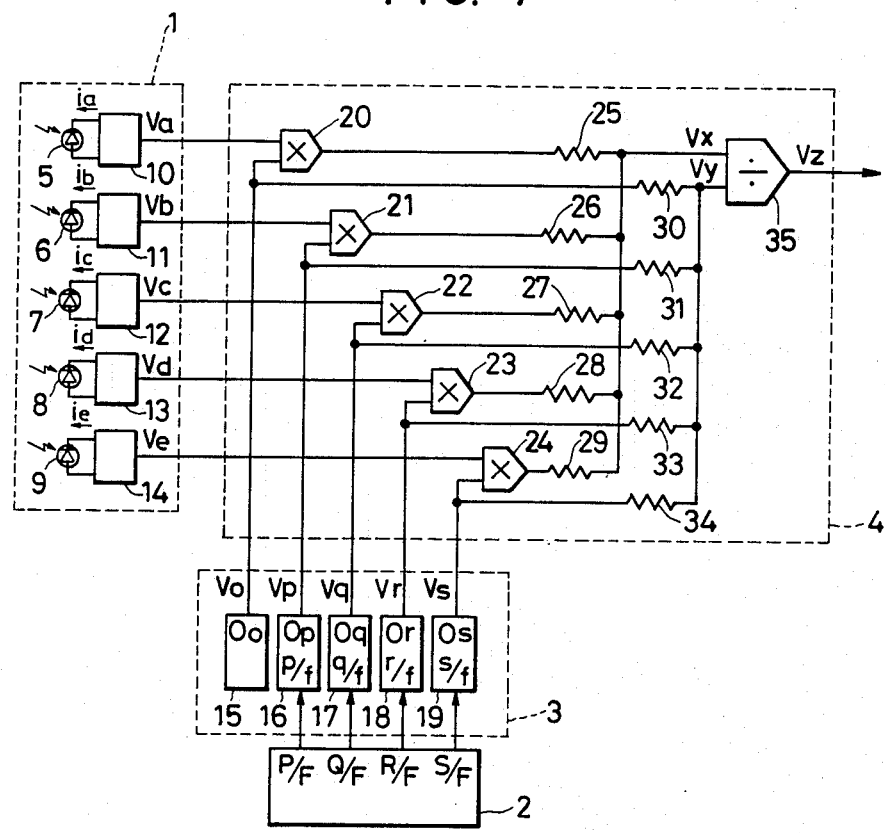
FIG. 1 is a circuit diagram showing a first embodiment of the present invention.

FIG. 1 is a circuit diagram showing an photometric device according to a first embodiment of the present invention. In FIG. 1, the photometric device includes a light-receiving means 1, a trimming data output means 2, a weighting coefficient setting means 3, and an arithmetic means 4. The internal arrangements of these means will be described later in detail.

Figure 2:
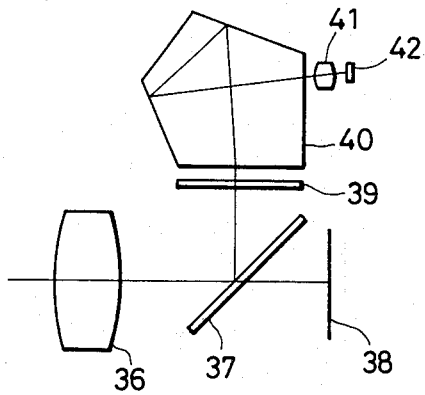
FIGS. 2 and 3 are views respectively showing arrangements of optical systems of a single-lens reflex camera and a lens shutter camera.
Figure 3:
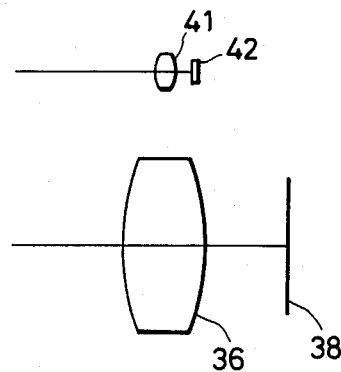

FIGS. 2 and 3 respectively show optical systems of a single-lens reflex camera and a lens shutter camera to which the device according to the first embodiment of the present invention is applied. The optical system shown in FIG. 2 includes a photographing lens 36, a quick return mirror 37, a film surface 38, a focusing screen 39, a pentagonal prism 40, a focusing lens 41, and a light-receiving portion 42. The optical system shown in FIG. 3 includes a photographing lens 36, a film surface 38, a focusing lens 41, and a light-receiving portion 42. In each system, light from an object is focused on the light-receiving portion 42 through the focusing lens 41 so as to perform photometry.

Figure 4:
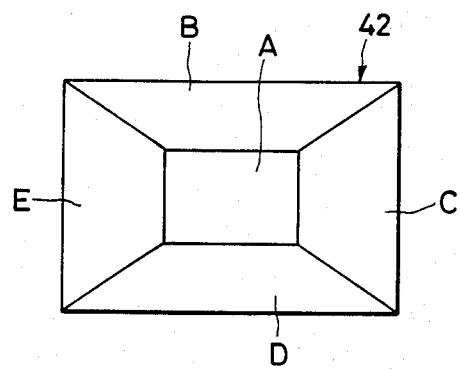
FIG. 4 is a view showing a split pattern of a light-receiving surface of a light-receiving portion shown in FIG. 1.

FIG. 4 is a view depicting a light-receiving surface of the light-receiving portion 42 shown in FIGS. 2 and 3. In this embodiment, the light-receiving surface of the light-receiving portion 42 is split into five regions A, B, C, D, and E, and luminance photometric operations of field regions corresponding to these regions are performed.

In FIG. 1, silicon photodiodes (SPDs) 5, 6, 7, 8, and 9 correspond to the above regions A to E, and generate photo-currents ia, ib, ic, id, and ie corresponding to the luminances of the regions. Logarithmic compression circuits 10, 11, 12, 13, and 14 logarithmically compress these photo-currents ia to ie to output voltages Va, Vb, Vc, Vd, and Ve. These voltages Va, Vb, Vc, Vd, and Ve can be expressed as follows using constants a1, a2, a3, a4, a5 ($\geq 0$), and b ($>0$) and photo-currents ia, ib, ic, id, and ie:

$$Va = a1 + b \ln ia$$

$$Vb = a2 + b \ln ib$$

$$Vc = a3 + b \ln ic$$

$$Vd = a4 + b \ln id$$

$$Ve = a5 + b \ln ie$$

When the luminances of the regions A to E are equal to each other, the constants a1, a2, a3, a4, and a5 are set in advance in the logarithmic compression circuits 10 to 14 so as to yield $Va = Vb = Vc = Vd = Ve$.

The trimming data output means 2 outputs data corresponding to the size of a photographing frame which is set according to the photographer's will from output terminals P/F, Q/F, R/F, and S/F. In this embodiment, trimming data is binary data which represents only whether or not trimming is performed by a preset amount, for the sake of simplicity. More specifically, when an upper portion of the frame, i.e., a field region corresponding to the region B shown in FIG. 4 is to be trimmed, an H-level (high-level) voltage is output from the output terminal P/F. When the trimming operation is not performed, an L-level (low-level) voltage is output from the output terminal P/F. When a right portion of the frame, i.e., a field region corresponding to the region C in FIG. 4, is to be trimmed, an H-level voltage is output from the output terminal Q/F; and if not, an L-level voltage is output therefrom. When a lower portion of a frame, i.e., a field region corresponding to the region D in FIG. 4 is to be trimmed, an H-level voltage is output from the output terminal R/F; and if not, an L-level voltage is output therefrom. When a left portion, i.e., a field region corresponding to the region E in FIG. 4, is to be trimmed, an H-level voltage is output from the output terminal S/F; and if not, an L-level voltage is output therefrom. In this manner, the trimming data output means 2 outputs the binary trimming data of the upper, right, lower, left portions of the frame set by the photographer from the output terminals P/F, Q/F, R/F, and S/F.

A weighting coefficient generator 15 always generates a predetermined voltage Vo from an output terminal Oo. Weighting coefficient generators 16, 17, 18, and 19 receive trimming data output from the four output terminals P/F, Q/F, R/F, and S/F of the trimming data output means at input terminals p/f, q/f, r/f, and s/f, respectively, and output voltages Vp, Vq, Vr, and Vs determined corresponding to the levels of the input voltages from output terminals Op, Oq, Or, and Os, respectively.

Figure 5:
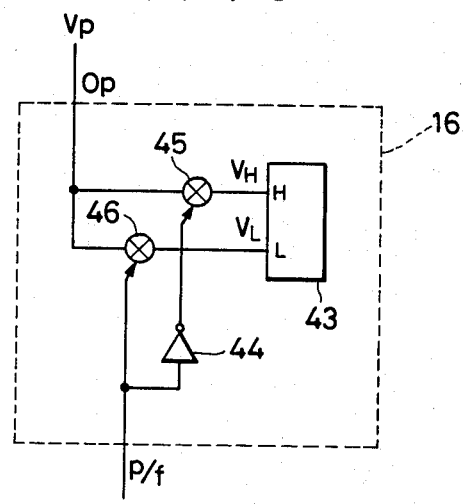
FIG. 5 is a circuit diagram showing an internal arrangement in a weighting coefficient generator shown in FIG. 1.

FIG. 5 shows a detailed arrangement of the weighting coefficient generator 16. As shown in FIG. 5, the generator 16 includes a reference voltage generator 43, an inverter 44, and analog switches 45 and 46. The reference voltage generator 43 generates two reference voltages $V_H$ and $V_L$ ($V_H > V_L$). The inverter 44 inverts the trimming data input at the input terminal p/f. The analog switches 45 and 46 are enabled when voltages applied to their control terminals are at H level, and are disabled when the voltages are at L level. The analog switch 45 enables or disables the reference voltage $V_H$, and the analog switch 46 enables or disables the reference voltage $V_L$. Voltages applied to the control terminals of the analog switches 45 and 46 go to L and H levels respectively when the voltage input at the input terminal p/f is at H level. When the voltage input at the input terminal p/f is at L level, the voltages applied to the control terminals of the switches 45 and 46 respectively go to H and L levels. Therefore, when the voltage input at the input terminal p/f is at H level, the voltage Vp output from the output terminal becomes "$V_L$"; when the voltage input at the input terminal p/f is at L level, the voltage Vp output from the output terminal Op becomes "$V_H$". This applies to the weighting coefficient generators 17 to 19, and a detailed description thereof will be omitted.

As described above, the weighting coefficient generators 15 to 19 generate the voltages Vo, Vp, Vq, Vr, and Vs corresponding to the trimming data. The voltages Vo, Vp, Vq, Vr, and Vs serve as the weighting coefficients for the five regions A, B, C, D, and E shown in FIG. 4, respectively.

Multipliers 20, 21, 22, 23, and 24 multiply the five output voltages Va, Vb, Vc, Vd, and Ve from the light-receiving means 1 with the five output voltages Vo, Vp, Vq, Vr, and Vs from the weighting coefficient setting means 3. More specifically, the output voltage from the multiplier 20 is ($Va \times Vo$); the output voltage from the multiplier 21 is ($Vb \times Vp$); the output voltage from the multiplier 22 is ($Vc \times Vq$); the output voltage from the multiplier 23 is ($Vd \times Vr$); and the output voltage from the multiplier 24 is ($Ve \times Vs$). Resistors 25, 26, 27, 28, and 29 have identical resistances, and constitute an averaging circuit for calculating an average value of the output voltages from the multipliers 20 to 24. An output voltage Vx from the averaging circuit is given by:

$$Vx = (Va \cdot Vo + Vb \cdot Vp + Vc \cdot Vq + Vd \cdot Vr + Ve \cdot Vs)/5$$

Resistors 30, 31, 32, 33, and 34 have identical resistances, and constitute an averaging circuit for calculating an average value of the output voltages Vo, Vp, Vq, Vr, and Vs from the weighting coefficient setting means 3. An output voltage Vy from the averaging circuit is given by:

$$Vy = (Vo + Vp + Vq + Vr + Vs)/5$$

A divider 35 divides the output voltages from the two averaging circuits. More specifically, an output voltage Vz from the divider 35 is given by:

$$Vz = Vx/Vy$$
$$= (Va \cdot Vo + Vb \cdot Vp + Vc \cdot Vq + Vd \cdot Vr + Ve \cdot Vs)$$
$$/(Vo + Vp + Vq + Vr + Vs)$$

The output voltage Vz serves as a photometric value output from the photometric device of this embodiment.

Figure 6:
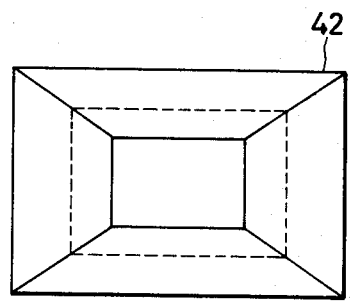
FIGS. 6 and 7 are views showing a trimming operation in the first embodiment.
Figure 7:
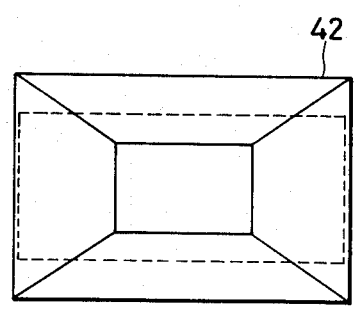

Operations in a normal photographing mode, in a trimming photographing mode for a pseudo telescopic operation as indicated by a broken line in FIG. 6, and in a trimming photographing mode for a panoramic photography, as indicated by a broken line in FIG. 7 will be described below. Note that FIGS. 6 and 7 show split patterns of the light-receiving surface of the light-receiving portion 42. However, since these split patterns correspond to the normal photographing frame, the trimming patterns are illustrated on the light receiving surfaces for the sake of easy understanding of the correspondence between this embodiment and the trimming photographing frame patterns with respect to the normal photographing frame.

(1) Normal photographing mode

Since no trimming operation is performed for the upper, right, lower, and left portions of the frame, all the voltages output from the four output terminals P/F, Q/F, R/F, and S/F of the trimming data output means 2 shown in FIG. 2 are at L level. Therefore, the five output voltages Vo, Vp, Vq, Vr, and Vs from the weighting coefficient setting means 3 are respectively Vo=Vo, Vp=$V_H$, Vq=$V_H$, Vr=$V_H$, and Vs=$V_H$. Thus, the photometric value Vz is given by:

$$Vz = \{Va \cdot Vo + V_H(Vb + Vc + Vd + Ve)\}/(Vo + 4V_H)$$

(2) Trimming photographing mode indicated by broken line in FIG. 6.

Since all the upper, right, lower, and left portions of the frame are to be trimmed, all the voltages output from the four output terminals P/F, Q/F, R/F, and S/F of the trimming data output means 2 shown in FIG. 2 are at H level. Therefore, the five output voltages Vo, Vp, Vq, Vr, and Vs from the weighting coefficient setting means 3 are respectively Vo=Vo, Vp=$V_L$, Vq=$V_L$, Vr=$V_L$, and Vs=$V_L$. Thus, the photometric value Vz is given by:

$$Vz = \{Va \cdot Vo + V_L(Vb + Vc + Vd + Ve)\}/(Vo + 4V_L)$$

(3) Trimming photographing mode indicated by broken line in FIG. 7

Since only the upper and lower portions of the frame are to be trimmed, the output terminals P/F and Q/F of the trimming data output means 2 output H-level voltages, and the output terminals R/F and S/F output L-level voltages. Therefore, the five output voltages Vo, Vp, Vq, Vr, and Vs from the weighting coefficient setting means 3 are respectively Vo=Vo, Vp=$V_L$, Vq=$V_H$, Vr=$V_L$, and Vs=$V_H$. Thus, the photometric value Vz is given by:

$$Vz = \{Va \cdot Vo + V_L(Vb + Vd) + V_H(Vc + Ve)\}/(Vo + 2V_L + 2V_H)$$

Since $V_H > V_L$, when the trimming photography indicated by the broken line in FIG. 6 is performed, photometry concentrated on the central portion is performed as compared to the normal photographing mode. When the trimming photography is indicated by the broken line in FIG. 7 is performed, photometry is performed in preference to the right-and-left direction of the central portion as compared to the normal photographing mode.

Figure 8A:
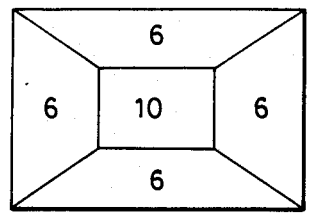
FIGS. 8A, 8B, and 8C are respectively views showing numerical values of weighting coefficients in a normal photographing mode and in the trimming photographing mode shown in FIGS. 6 and 7.
Figure 8B:
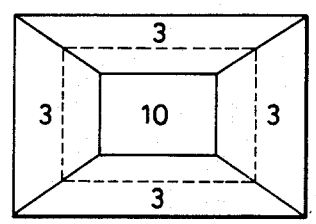
Figure 8C:
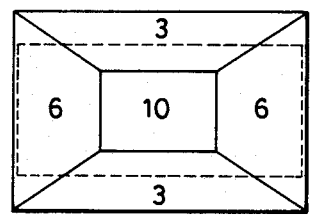

In order to help understanding of this embodiment, FIGS. 8A, 8B, and 8C show numerical values of the weighting coefficients in the normal photographing mode and the trimming photographing modes shown in FIGS. 6 and 7. For the sake of simplicity, Vo=10, $V_H$=6, and $V_L$=3.

Figure 9:
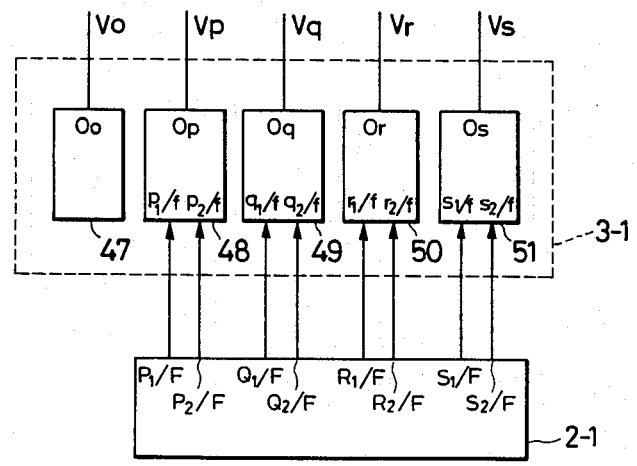
FIG. 9 is a circuit diagram showing a second embodiment of the present invention.

FIG. 9 shows a photometric device according to a second embodiment of the present invention. The photometric device shown in FIG. 9 includes a trimming data output means 2-1 and a weighting coefficient setting means 3-1, which are obtained by partially modifying the trimming data output means 2 and the weighting coefficient setting means 3 in the embodiment shown in FIG. 1. Other arrangements are the same as those in FIG. 1, and are omitted from FIG. 9.

The trimming data output means 2-1 comprises eight output terminals $P_1$/F, $P_2$/F, $Q_1$/F, $Q_2$/F, $R_1$/F, $R_2$/F, $S_1$/F, and $S_2$/F, and outputs therefrom data corresponding to a size of a photographing frame which is set according to the photographer's will. The output terminals $P_1$/F and $P_2$/F output trimming data of the upper portion of the frame, the output terminals $Q_1$/F and $Q_2$/F output trimming data of the right portion of the frame, the output terminals $R_1$/F and $R_2$/F output trimming data of the lower portion of the frame, and the output terminals $S_1$/F and $S_2$/F outputs trimming data of the left portion of the frame. A combination of voltage levels is changed in accordance with a trimming amount.

In the embodiment shown in FIG. 9, a camera capable of trimming in four sizes in four directions of upper, right, lower, and left portions of the frame (see FIG. 11) is assumed. Note that the four sizes of the photographing frame are represented in % with respect to the size of the frame in the normal photographing mode, and are respectively given by 100%, a%, b%, and c% from the larger one. Combinations of the output voltage levels from the two output terminals $P_1$/F and $P_2$/F of the trimming data output means 2-1 of this embodiment are set as shown in Table 1 below.

TABLE 1

| Size of Photographing Frame | $P_1$/F | $P_2$/F |
|---|---|---|
| 100% | L | L |
| a% | L | H |
| b% | H | L |
| c% | H | H |

In this embodiment, the trimming size of the upper portion of the frame is set by the combinations of the output voltage levels from the output terminals $P_1$/F and $P_2$/F. The trimming sizes of the right, lower, and left portions of the frame are similarly set in accordance with combinations of the output voltage levels from the output terminals $Q_1$/F and $Q_2$/F, combinations of the output voltage levels from the output terminals $R_1$/F and $R_2$/F, and combinations of the output voltage levels from the output terminals $S_1$/F and $S_2$/F.

In FIG. 9, a weighting coefficient generator 47 always generates a predetermined voltage Vo from its output terminal Oo. Weighting coefficient generators 48, 49, 50, and 51 respectively receive trimming data output from the eight output terminals $P_1$/F, $P_2$/F, Q₁/F, Q₂/F, R₁/F, R₂/F, S₁/F, and S₂/F of the trimming data output means 2-1 at input terminals p₁/f, p₂/f, q₁/f, q₂/f, r₁/f, r₂/f, s₁/f, and s₂/f, and respectively output voltages Vp, Vq, Vr, and Vs from output terminals Op, Oq, Or, and Os.

Figure 10:
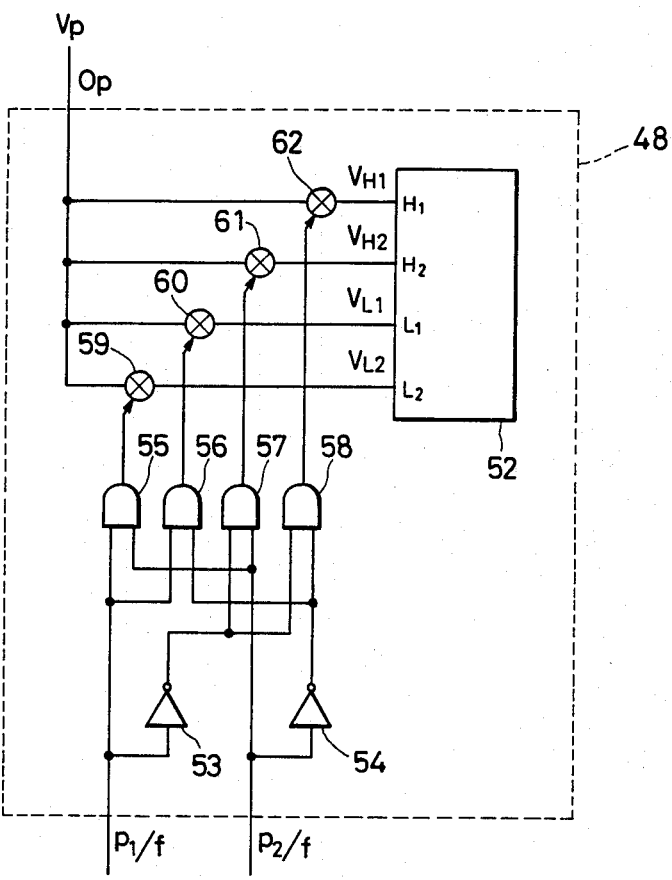
FIG. 10 is a circuit diagram showing an internal arrangement of a weighting coefficient generator shown in FIG. 9.

FIG. 10 shows a detailed arrangement of the weighting coefficient generator 48. The generator 48 includes a reference voltage generator 52, inverters 53 and 54, AND gates 55, 56, 57, and 58, and analog switches 59, 60, 61, and 62. The reference voltage generator 52 generates four reference voltages $V_{H1}$, $V_{H2}$, $V_{L1}$, and $V_{L2}$ ($V_{H1} > V_{H2} > V_{L1} > V_{L2}$). The inverters 53 and 54 respectively invert trimming data input at the input terminals p₁/f and p₂/f. The two input terminals of the AND gate 55 are connected to the input terminals p₁/f and p₂/f; the two input terminals of the AND gate 56 are connected to the input terminal p₁/f and the output terminal of the inverter 56; the two input terminals of the AND gate 57 are connected to the output terminal of the inverter 53 and the input terminal p₂/f; and the two input terminals of the AND gate 58 are connected to the output terminals of the inverters 53 and 54.

As can be seen from the above connection relationship, one of the AND gates 55 to 58 outputs an H-level voltage, and the remaining three gates output L-level voltages in accordance with the voltage levels input at the input terminals p₁/f and p₂/f. The analog switches 59, 60, 61, and 62 are enabled when the voltages applied to their control terminals are at H level and are disabled when at L level. The control terminal of the analog switch 59 is connected to the output terminal of the AND gate 55; the control terminal of the analog switch 60 is connected to the output terminal of the AND gate 56; the control terminal of the analog switch 61 is connected to the output terminal of the AND gate 57; and the control terminal of the analog switch 62 is connected to the output terminal of the AND gate 58. The analog switches 59 to 62 enable or disable the reference voltages $V_{L2}$, $V_{L1}$, $V_{H2}$, and $V_{H1}$, respectively.

The weighting coefficient generator 48 with the above arrangement outputs one of the four reference voltages $V_{H1}$, $V_{H2}$, $V_{L1}$, and $V_{L2}$ as the voltage Vp from the output terminal Op in accordance with the voltage levels input at the input terminals p₁/f and p₂/f. The relationship between the voltage levels input at the input terminals p₁/f and p₂/f and the values of the output voltage Vp is summarized in Table 2 below.

TABLE 2

| p₁/f | p₂/f | Vp |
| --- | --- | --- |
| L | L | $V_{H1}$ |
| L | H | $V_{H2}$ |
| H | L | $V_{L1}$ |
| H | H | $V_{L2}$ |

The weighting coefficient generators 49 to 51 have the same arrangement as described above, and a detailed description thereof will be omitted.

As described above, the weighting coefficient generators 47 to 51 generate the voltages Vo, Vp, Vq, Vr, and Vs corresponding to the trimming data. The voltages Vo, Vp, Vq, Vr, and Vs serve as the weighting coefficients for the five regions A, B, C, D, and E shown in FIG. 4, respectively.

Figure 11:
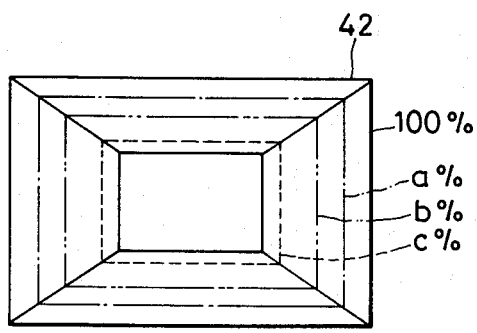
FIG. 11 is a view showing a trimming pattern on the light-receiving surface in the second embodiment.

FIG. 11 shows the above-mentioned four trimming patterns on the light-receiving surface. In FIG. 11, an alternate long and short dashed line indicates a photographing frame when the size of the photographing frame is trimmed to "a%"; an alternate long and two short dashed line indicates a photographing frame when the size of the photographing frame is trimmed to "b%"; and a broken line indicates a photographing frame when the size of the photographing frame is trimmed to "c%". The values of the five weighting coefficients of the above cases are summarized in Table 3 below.

TABLE 3

| Size of Photographing Frame | Weighting Coefficient | |
| --- | --- | --- |
| | Vo | Vp to Vs |
| 100% | Vo | $V_{H1}$ |
| a% | Vo | $V_{H2}$ |
| b% | Vo | $V_{L1}$ |
| c% | Vo | $V_{L2}$ |

Since $V_{H1} > V_{H2} > V_{L1} > V_{L2}$, when the photographing frame shown in FIG. 11 is to be trimmed, photometry more concentrated on the central portion is performed as the size of the photographing frame is decreased.

Figures 12, 13:
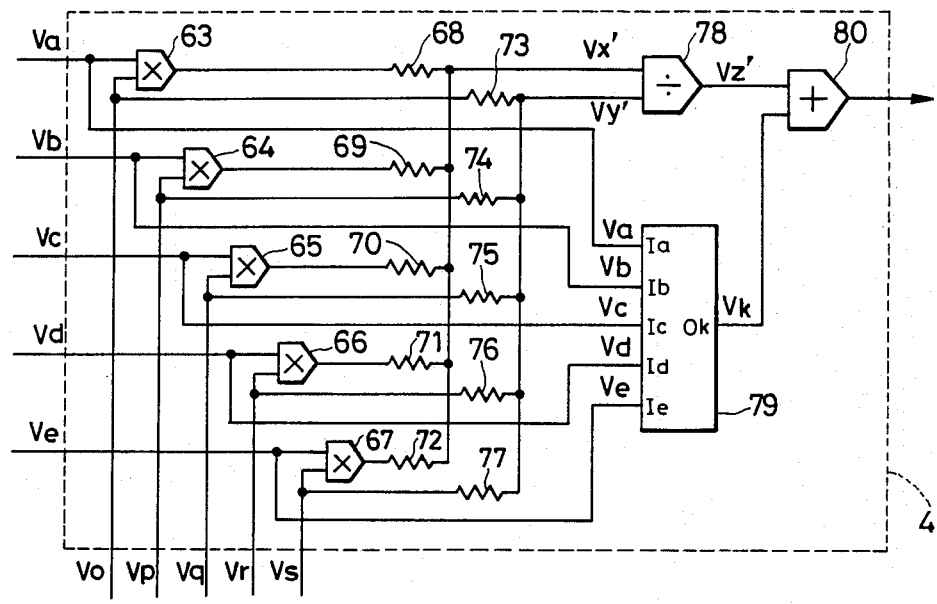
FIG. 12 is a circuit diagram showing a third embodiment of the present invention.
FIG. 13 is a view showing another split pattern of the light-receiving surface of the light-receiving portion shown in FIG. 1.

FIG. 12 shows a third embodiment of the present invention. An arithmetic means 4-1 is obtained by partially modifying that shown in FIG. 1, and other arrangements are the same as those in FIG. 1 and omitted from FIG. 12.

The arithmetic means 4-1 includes multipliers 63, 64, 65, 66, and 67, resistors 68, 69, 70, 71, and 72 having identical resistances, resistors 73, 74, 75, 76, and 77 having identical resistances, and a divider 78. These components are the same as those in FIG. 1, and a detailed description thereof will be omitted herein. A correction value arithmetic circuit 79 receives voltages Va, Vb, Vc, Vd, and Ve corresponding to luminance data of the five regions A, B, C, D, and E shown in FIG. 4 at input terminals Ia, Ib, Ic, Id, and Ie, and outputs a correction value Vk from an output terminal Ok. A variety of arrangements of the correction value arithmetic circuit 79 may be proposed. For example, the correction value Vk can be determined in accordance with differences between the voltage Va and the voltages Vb, Vc, Vd, and Ve. The correction value arithmetic circuit 79 aims at automatically calculating a correction value so that optimal exposure can be obtained for a scene such as a back-lit scene wherein optimal exposure is difficult to obtain in the conventional photometric method concentrated on the central portion. In FIG. 12, an adder 80 adds the output voltage Vk from the correction value arithmetic circuit 79 to an output voltage Vz' from the divider 78. The output voltage (Vz'+Vk) from the adder 80 is output as a photometric value in the embodiment shown in FIG. 12.

In this embodiment, only luminance data is weighted in accordance with trimming data. However, the output voltage Vk from the correction value arithmetic circuit 79 may be weighted in accordance with the trimming data.

According to the first to third embodiments of the present invention, the weighting coefficients of luminance data of split field regions are changed in accordance with trimming data. Therefore, optimal exposure can be provided to a trimmed photographing frame as well as in the normal photographing mode with a simple arrangement. When a photographer arbitrarily sets a portion to be trimmed, optimal exposure can be provided. More specifically, optimal exposure can be provided for both a case wherein the upper, lower, right, and left portions of the frame are uniformly trimmed to provide a telescopic effect, as shown in FIG. 6, and a case wherein only the upper and lower portions of the frame are trimmed to provide a panoramic effect, as shown in FIG. 7.

Furthermore, the photometric regions of the light receiving surface may be split into a plurality of sub-regions 42a to 42z, as shown in FIG. 12. Thus, the present invention can be applied to a photometric device capable of automatic exposure correction in a back-lit state.

In the first to third embodiments, the five-split light-receiving pattern is used. As shown in FIG. 13, field regions may be split into a larger number of sub-regions. In this case, the weighting coefficients of the regions can be determined in accordance with the trimming data as in the embodiment shown in FIG. 1. However, when the frame is trimmed as indicated by a broken line in FIG. 13, regions 42a to 42e at the periphery of the frame are not photographed in practice. Therefore, the weighting coefficients of these regions can be set to be "0" and can be ignored.

In the above embodiments, the weighting coefficient setting means 2 and 2-1 comprise logic circuits. However, these means may be achieved in a software manner using a microcomputer.

According to the first to third embodiments described above, the photometric device includes a trimming data output means for outputting data of a set trimming region, a light-receiving means for splitting an objective field into a plurality of regions, and outputting luminance data corresponding to the plurality of regions, a weighting coefficient setting means for changing weighting coefficients of the plurality of regions in accordance with the trimming data output from the trimming data output means, and an arithmetic means for calculating a photometric value based on the luminance data and the weighting coefficients corresponding to the plurality of regions. Thus, since the weighting coefficient of luminance data of a non-trimmed region is decreased in the trimming photographing mode, optimal exposure can be provided to a photographing frame in both the normal and trimming photographing modes without requiring a complicated arrangement.

A fourth embodiment of the present invention will be described hereinafter.

Figure 14:
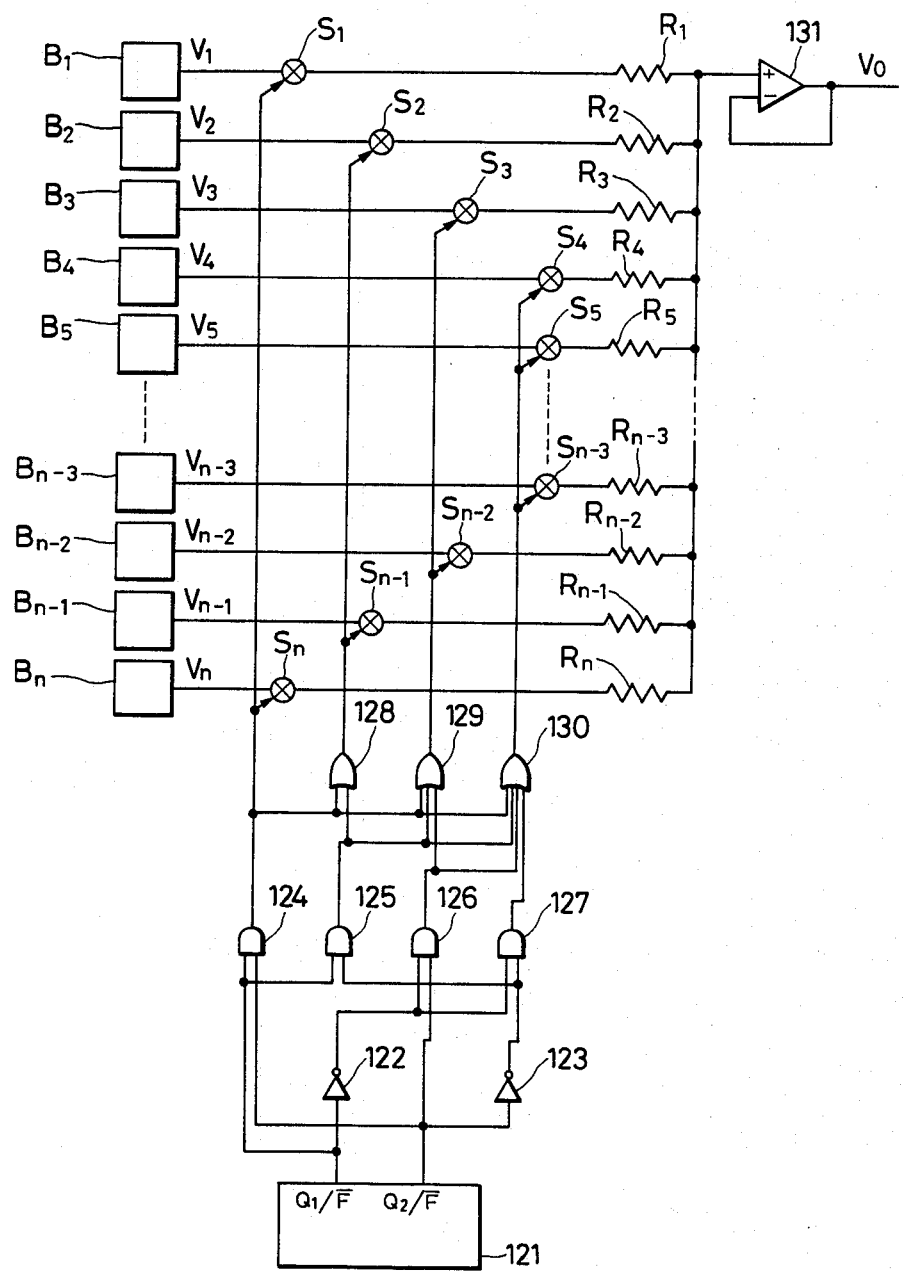
FIG. 14 is a circuit diagram showing a fourth embodiment of the present invention.

FIG. 14 is a circuit diagram showing a photometric device of the fourth embodiment. The photometric device includes a trimming data setting means and an arithmetic means. Note that FIG. 15 is a partial circuit diagram of FIG. 14.

Figure 16:
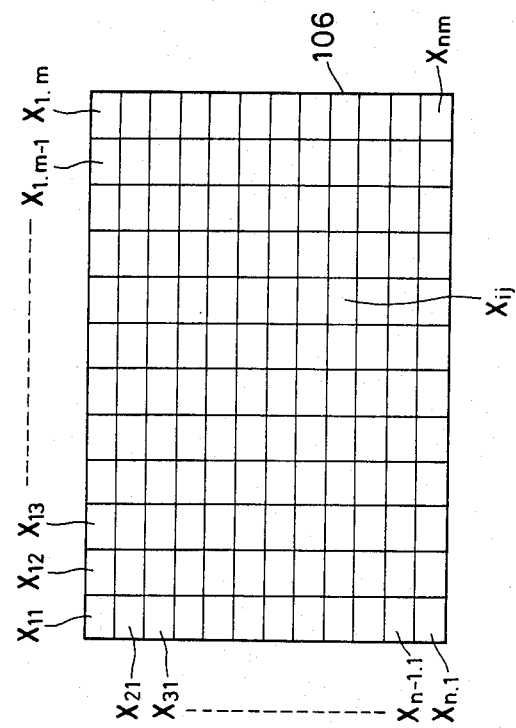
FIG. 16 is a view showing a split photometric region of a light-receiving surface according to the fourth embodiment of the present invention.

FIG. 16 shows a light-receiving surface of a light-receiving portion 106. In this embodiment, the light-receiving surface of the light-receiving portion is split into m×n regions (i.e., m in the horizontal direction and n in the vertical direction) so as to perform photometry for field regions corresponding to the split regions. In FIG. 16, a light-receiving portion in an ith row and a jth column is called $X_{ij}$.

Figure 15:
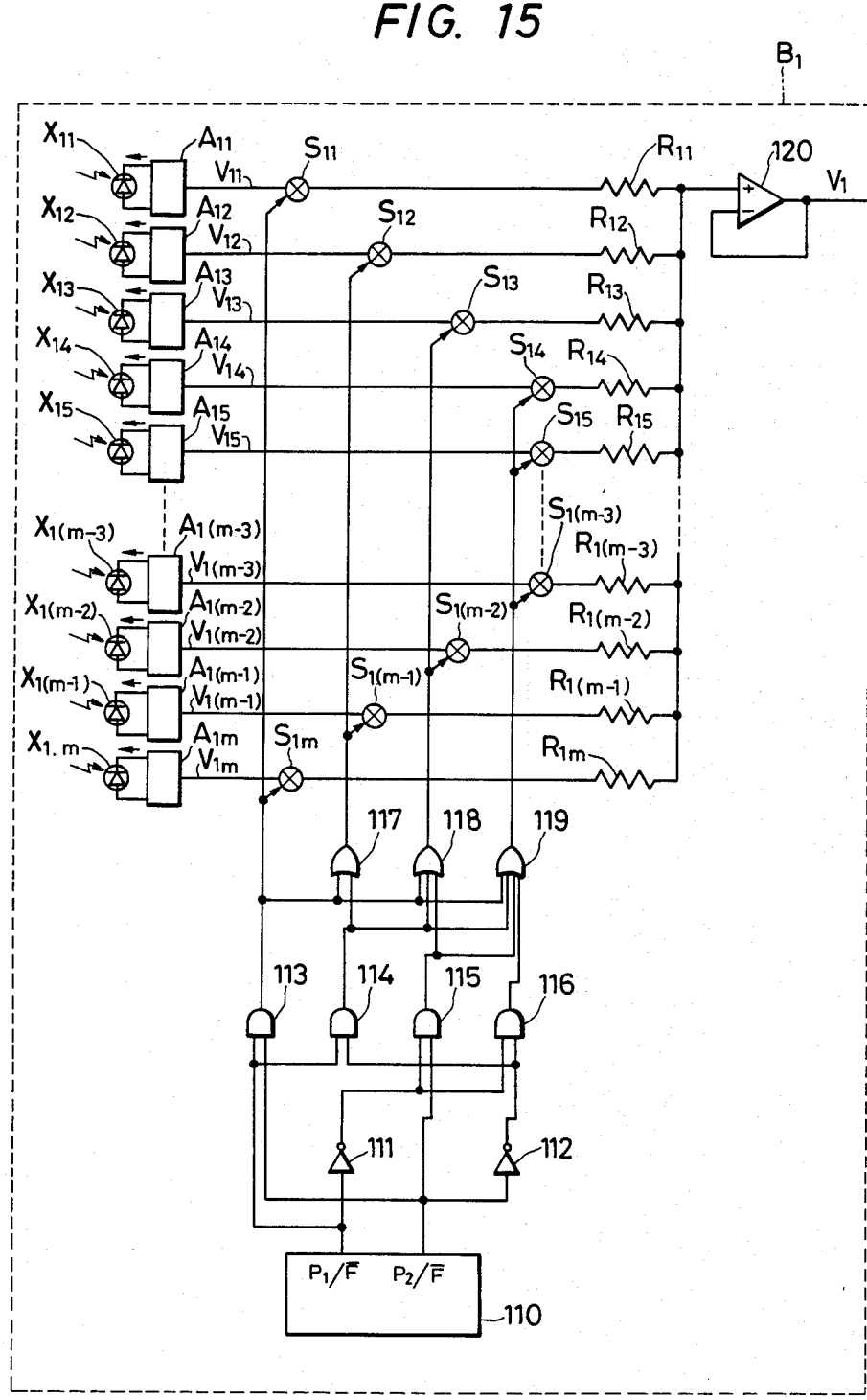
FIG. 15 is a partial circuit diagram of FIG. 14.

In FIG. 15, silicon photodiodes (SPDs) $X_{11}, X_{12}, X_{13}, X_{14}, X_{15}, \ldots, X_{1(m-3)}, X_{1(m-2)}, X_{1(m-1)}$, and $X_{1m}$ correspond to the light-receiving regions in the first row of FIG. 16, and generate photo-currents $i_{11}, i_{12}, i_{13}, i_{14}, i_{15}, \ldots, i_{1(m-3)}, i_{1(m-2)}, i_{1(m-1)}$, and $i_{1m}$ corresponding to the luminances of these regions. Logarithmic compression circuits $A_{11}, A_{12}, A_{13}, A_{14}, A_{15}, \ldots,$ $A_{1(m-3)}, A_{1(m-2)}, A_{1(m-1)},$ and $A_{1m}$ logarithmically compress these photo-currents to generate voltage values $V_{11}, V_{12}, V_{13}, V_{14}, V_{15}, \ldots, V_{1(m-3)}, V_{1(m-2)}, V_{1(m-1)},$ and $V_{1m}$. The voltages $V_{11}, V_{12}, V_{13}, V_{14}, V_{15}, \ldots V_{1(m-3)}, V_{1(m-2)}, V_{1(m-1)},$ and $V_{1m}$ can be expressed as follows using constants $a_{11}, a_{12}, a_{13}, a_{14}, a_{15}, \ldots, a_{1(m-3)}, a_{1(m-2)}, a_{1(m-1)},$ and $a_{1m}$, and the photo-currents $i_{11}, i_{12}, i_{13}, i_{14}, i_{15}, \ldots, i_{1(m-3)}, i_{1(m-2)}, i_{1(m-1)},$ and $i_{1m}$:

$$V_{11} = a_{11} + b\log i_{11}$$
$$V_{12} = a_{12} + b\log i_{12}$$
$$V_{13} = a_{13} + b\log i_{13}$$
$$V_{14} = a_{14} + b\log i_{14}$$
$$V_{15} = a_{15} + b\log i_{15}$$

.
.
.

$$V_{1(m-3)} = a_{1(m-3)} + b\log i_{1(m-3)}$$
$$V_{1(m-2)} = a_{1(m-2)} + b\log i_{1(m-2)}$$
$$V_{1(m-1)} = a_{1(m-1)} + b\log i_{1(m-1)}$$
$$V_{1m} = a_{1m} + b\log i_{1m}$$

When the luminances of the regions are equal to each other, $a_{11}, a_{12}, a_{13}, a_{14}, a_{15}, \ldots, a_{1(m-3)}, a_{1(m-2)}, a_{1(m-1)},$ and $a_{1m}$ are preset in the logarithmic compression circuits $A_{11}, A_{12}, A_{13}, A_{14}, A_{15}, \ldots, A_{1(m-3)}, A_{1(m-2)}, A_{1(m-1)},$ and $A_{1m}$, so that $V_{11}=V_{12}=V_{13}=V_{14}=V_{15}= \ldots =V_{1(m-3)}=V_{1(m-2)}=V_{1(m-1)}=V_{1m}$.

A trimming data setting means 110 outputs trimming data in the horizontal direction of the photographing frame determined according to the photographer's will from two output terminals $P_1/\overline{F}$ and $P_2/\overline{F}$. In this embodiment, four trimming sizes can be set in the horizontal direction of the photographing frame, and the right and left trimming sizes are equal to each other for the sake of simplicity.

The four sizes of the photographing frame are represented in % with respect to the size of the frame in the normal photographing mode, and are given by 100%, a%, b%, and c% from the larger one. In this embodiment, the output voltage levels from the output terminals $P_1/\overline{F}$ and $P_2/\overline{F}$ of the trimming data setting means 110 are set as follows:

| Size of Photographing Frame | $P_1/\overline{F}$ | $P_2/\overline{F}$ |
|---|---|---|
| 100% | H | H |
| a% | H | L |
| b% | L | H |
| c% | L | L |

In this embodiment, the trimming size in the horizontal direction of the frame is set by the combinations of the output voltage levels from the output terminals $P_1/\overline{F}$ and $P_2/\overline{F}$.

In this embodiment, the trimming data is also formed on a film surface (e.g., between film frames or a film portion outside each photographing frame), and a specific region is enlarged and printed based on this data during printing.

In FIG. 15, inverters 111 and 112 and AND gates 113, 114, 115, and 116 are connected to the trimming data setting means 110. The input terminal of the inverter 111 is connected to the output terminal $P_1/\overline{F}$ of the trimming data setting means 110, and the input terminal of the inverter 112 is connected to the output terminal $P_2/\overline{F}$ thereof. The inverters 111 and 112 invert their input voltage levels. The two input terminals of the AND gate 113 are connected to the two output terminals $P_1/\overline{F}$ and $P_2/\overline{F}$ of the trimming data setting means 110. The two input terminals of the AND gate 114 are connected to the output terminal $P_1/\overline{F}$ and the output terminal of the inverter 112. The two input terminals of the AND gate 115 are connected to the output terminal of the inverter 111 and the output terminal $P_2/\overline{F}$ of the trimming data setting means 110. The two input terminals of the AND gate 116 are connected to the output terminal of the inverters 111 and 112. In this manner, one of the AND gates 113 to 116 outputs an H-level voltage in accordance with the trimming size in the horizontal direction of the frame, and the remaining three AND gates output L-level voltages. More specifically, if the size in the horizontal direction of the photographing frame is 100%, only the AND gate 113 outputs an H-level voltage; when a%, only the AND gate 114 outputs an H-level voltage; when b%, only the AND gate 115 outputs an H-level voltage; and when c%, only the AND gate 116 outputs an H-level voltage. OR gates 117, 118, and 119 are connected to the AND gates 113 to 116. The two input terminals of the OR gate 117 are connected to the output terminals of the AND gates 113 and 114. The three input terminals of the OR gate 118 are connected to the output terminals of the AND gates 113, 114, and 115. The four input terminals of the OR gate 119 are connected to the output terminals of the AND gates 113 to 116.

Analog switches $S_{11}, S_{12}, S_{13}, S_{14}, S_{15}, \ldots, S_{1(m-3)}, S_{1(m-2)}, S_{1(m-1)}$, and $S_{1m}$ enable or disable the output voltages $V_{11}, V_{12}, V_{13}, V_{14}, V_{15}, \ldots, V_{1(m-3)}, V_{1(m-2)}, V_{1(m-1)}$, and $V_{1m}$ from the logarithmic compression circuits $A_{11}, A_{12}, A_{13}, A_{14}, A_{15}, \ldots, A_{1(m-3)}, A_{1(m-2)}, A_{1(m-1)}$, and $A_{1m}$ in accordance with the levels of the voltages applied to their control terminals. The control terminals of the switches $S_{11}$ and $S_{1m}$ are connected to the output terminal of the AND gate 113. The control terminals of the analog switches $S_{12}$ and $S_{1(m-1)}$ are connected to the output terminal of the OR gate 117. The control terminals of the analog switches $S_{13}$ and $S_{1(m-2)}$ are connected to the output terminal of the OR gate 118. The control terminals of the analog switches $S_{14}, S_{15}, \ldots, S_{1(m-3)}$ are connected to the output terminal of the OR gate 119. In this manner, the analog switches $S_{11}, S_{12}, S_{13}, S_{14}, S_{15}, \ldots, S_{1(m-3)}, S_{1(m-2)}, S_{1(m-1)}, S_{1m}$ are enabled or disabled in accordance with the output voltage levels of the AND gates 113 to 116. More specifically, when only the AND gate 113 is at H level, all the analog switches $S_{11}$ to $S_{1m}$ are enabled (there is no disabled switch). When only the AND gate 114 is at H level, only the analog switches $S_{11}$ and $S_{1m}$ are disabled (other analog switches are enabled). When only the AND gate 115 is at H level, only the analog switches $S_{11}, S_{12}, S_{1(m-1)}$, and $S_{1m}$ are disabled (other analog switches are enabled). When only the AND gate 116 is at H level, only the analog switches $S_{11}, S_{12}, S_{13}, S_{1(m-2)}, S_{1(m-1)}$, and $S_{1m}$ are disabled (other analog switches are enabled).

Resistors $S_{11}, S_{12}, S_{13}, S_{14}, S_{15}, \ldots, S_{1(m-3)}, S_{1(m-2)}, S_{1(m-1)}$, and $S_{1m}$ constitute an arithmetic circuit for calculating a weighting average value according to their resistances. For the sake of simplicity, these resistors have the same resistance, and constitute an average value circuit.

The output terminal and the inverting input terminal of an operational amplifier 120 are connected to each other, and the operational amplifier 120 is used as a voltage follower. The voltage appearing at the output terminal of the operational amplifier 120 is always an output voltage $V_1$ regardless of the states of the circuits connected to the output terminal.

The relationship between the size in the horizontal direction of the photographing frame and the output voltage $V_1$ from the average value circuit is summarized as follows.

| Size of Photographing Frame | $V_1$ |
|---|---|
| 100% | $(V_{11} + V_{12} + V_{13} + \ldots + V_{1(m-1)} + V_{1m})/m$ |
| a% | $(V_{12} + V_{13} + V_{14} + \ldots + V_{1(m-2)} + V_{1(m-1)})/(m-2)$ |
| b% | $(V_{13} + V_{14} + V_{15} + \ldots + V_{1(m-3)} + V_{1(m-2)})/(m-4)$ |
| c% | $(V_{14} + V_{15} + \ldots + V_{1(m-3)})/(m-6)$ |

As described above, m luminance data corresponding to the first row of a plurality of light-receiving portions are subjected to arithmetic processing and are converted to one output voltage $V_1$.

FIG. 14 shows an arithmetic circuit which uses a plurality of circuits equivalent to that shown in FIG. 15 so as to calculate a photometric value using output voltages corresponding to luminance data of each row and trimming data in the vertical direction of the photographing frame.

In FIG. 14, circuits $B_1, B_2, B_3, B_4, B_5, \ldots, B_{n-3}, B_{n-2}, B_{n-1}$, and $B_n$ are equivalent to a circuit for obtaining luminance data corresponding to each row in the horizontal direction of the photographing frame shown in FIG. 15, and output luminance data of first, second, $\ldots$, nth rows as voltages $V_1, V_2, \ldots, V_n$.

A trimming data setting means 121 outputs trimming data in the vertical direction of the photographing frame determined in accordance with the photographer's will from two output terminals $Q_1/\overline{F}$ and $Q_2/\overline{F}$. In this embodiment, four sizes of trimming operations can be performed in the vertical direction of the photographing frame. In particular, the upper and lower trimming sizes are equal to each other for the sake of simplicity.

The four sizes of the photographing frame are represented in % with respect to the size of the frame in the normal photographing mode, and are given by 100%, a%, b%, and c% from the larger one. In this embodiment, the output voltage levels from the output terminals $Q_1/\overline{F}$ amd $Q_2/\overline{F}$ of the trimming data setting means 121 are set as follows:

| Size of Photographing Frame | $Q_1/\overline{F}$ | $Q_2/\overline{F}$ |
|---|---|---|
| 100% | H | H |
| a% | H | L |
| b% | L | H |
| c% | L | L |

In this embodiment, the trimming size in the vertical direction of the frame is set by the combinations of the output voltage levels from the output terminals $Q_1/\overline{F}$ and $Q_2/\overline{F}$.

In FIG. 14, inverters 122 and 123 and AND gates 124, 125, 126, and 127 are connected to the trimming data setting means 121. The input terminal of the inverter 122 is connected to the output terminal $Q_1/\overline{F}$ of the trimming data setting means 121, and the input terminal of the inverter 123 is connected to the output terminal $Q_2/\overline{F}$ thereof. The inverters 122 and 123 invert their input voltage levels. The two input terminals of the AND gate 124 are connected to the two output terminals $Q_1/\overline{F}$ and $Q_2/\overline{F}$ of the trimming data setting means 121. The two input terminals of the AND gate 125 are connected to the output terminal $Q_1/\overline{F}$ and the output terminal of the inverter 123. The two input terminals of the AND gate 126 are connected to the output terminal of the inverter 122 and the output terminal $Q_2/\overline{F}$ of the trimming data setting means 121. The two input terminals of the AND gate 127 are connected to the output terminals of the inverters 122 and 123. In this manner, one of the AND gates 124 to 127 outputs an H-level voltage in accordance with the trimming size in the vertical direction of the frame, and the remaining three AND gates output L-level voltages. More specifically, if the size in the vertical direction of the photographing frame is 100%, only the AND gate 124 outputs an H-level voltage; when a%, only the AND gate 125 outputs an H-level voltage; when b%, only the AND gate 126 outputs an H-level voltage; and when c%, only the AND gate 127 outputs an H-level voltage.

OR gates 128, 129, and 130 are connected to the AND gates 124 to 127. The two input terminals of the OR gate 128 are connected to the output terminals of the AND gates 124 and 125. The three input terminals of the OR gate 129 are connected to the output terminals of the AND gates 124, 125, and 126. The four input terminals of th OR gate 130 are connected to the output terminals of the AND gates 124 to 127.

Analog switches $S_1, S_2, S_3, S_4, S_5, \ldots, S_{n-3}, S_{n-2}, S_{n-1}$, and $S_n$ enable or disable output voltages $V_1, V_2, V_3, V_4, V_5, \ldots, V_{n-3}, V_{n-2}, V_{n-1}$, and $V_n$ from the arithmetic circuits $B_1, B_2, B_3, B_4, B_5, \ldots, B_{n-3}, B_{n-2}, B_{n-1}$, and $B_n$ in accordance with the levels of the voltages applied at their control terminals. The control terminals of the analog switches $S_1$ and $S_n$ are connected to the output terminal of the AND gate 124. The control terminals of the analog switches $S_2$ and $S_{n-1}$ are connected to the output terminal of the OR gate 128. The control terminals of the analog switches $S_3$ and $S_{n-2}$ are connected to the output terminal of the OR gate 129. The control terminals of the analog switches $S_4, S_5, \ldots, S_{n-3}$ are connected to the output terminal of the OR gate 130. In this manner, the analog switches $S_1, S_2, S_3, S_4, S_5, \ldots, S_{n-3}, S_{n-2}, S_{n-1}$, and $S_n$ are enabled or disabled in accordance with the output voltage levels of the AND gates 124 to 127. More specifically, when only the AND gate 124 is at H level, all the analog switches $S_1$ to $S_n$ are enabled. When only the AND gate 125 is at H level, only the analog switches $S_1$ and $S_n$ are disabled (other analog switches are enabled). When only the AND gate 126 is at H level, only the analog switches $S_1, S_2, S_{n-1}$, and $S_n$ are disabled (other analog switches are enabled). When only the AND gate 127 is at H level, only the analog switches $S_1, S_2, S_3, S_{n-2}, S_{n-1}$, and $S_n$ are disabled (other analog switches are enabled).

Resistors $R_1, R_2, R_3, R_4, R_5, \ldots, R_{n-3}, R_{n-2}, R_{n-1}$, and $R_n$ constitute an arithmetic circuit for calculating an average value according to their resistances. In this embodiment, these resistors have identical resistances, for the sake of simplicity, and constitute an average value circuit.

The output terminal and inverting input terminal of an operational amplifier 131 are connected to each other and the operational amplifier 131 is used as a voltage follower. The voltage appearing at the output terminal of the operational amplifier 131 is always an output voltage $V_0$ of the average value circuit regardless of the states of the circuits connected to the output terminal.

The relationship between the vertical sizes of the photographing frame and the output voltages $V_0$ of the average value circuit can be summarized as follows.

| Size of Photographing Frame | $V_O$ |
|---|---|
| 100% | $(V_1 + V_2 + V_3 + \ldots + V_{n-1} + V_n)/n$ |
| a% | $(V_2 + V_3 + V_4 + \ldots + V_{n-2} + V_{n-1})/(n-2)$ |
| b% | $(V_3 + V_4 + V_5 + \ldots + V_{n-3} + V_{n-2})/(n-4)$ |
| c% | $(V_4 + V_5 + \ldots + V_{n-3})/(n-6)$ |

As described above, n luminance data $V_1, V_2, V_3, V_4, V_5, \ldots, V_{n-3}, V_{n-2}, V_{n-1}$, and $V_n$ corresponding to each row of a plurality of light-receiving regions are subjected to an arithmetic operation, and are output as one output voltage $V_0$.

In this manner, a photometric value when the photographing frame is trimmed in the horizontal and vertical directions is calculated as the output voltage $V_0$.

Figure 17:
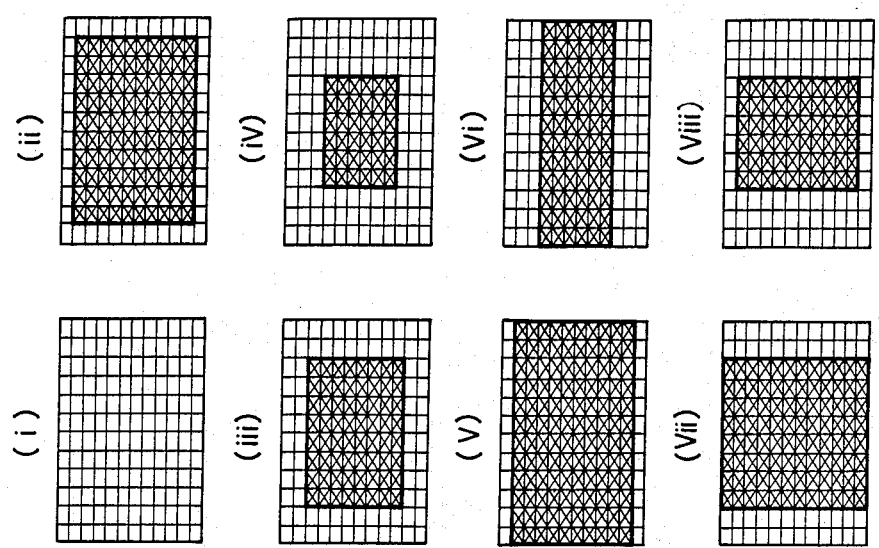
FIG. 17 is a view showing the relationship between an enlarged printing region and a split photometric region in the trimming photographing mode.

FIG. 17 shows a trimming operation in the horizontal and vertical directions of the photographing frame. In FIG. 17, vertical and horizontal solid lines represent a split pattern of the light-receiving portion which corresponds to a region corresponding to the entire frame in the normal photographing mode. Cross-hatched regions indicate regions corresponding to a frame to be enlarged and printed in the trimming photographing mode.

FIG. 17(i) shows the case of the normal photographing mode. In this mode, a frame is photographed at 100% in both the horizontal and vertical directions. FIG. 17(ii) shows the case of an a% trimming photographing mode in both the horizontal and vertical directions. FIG. 17(iii) shows the case of a b% trimming photographing mode in both the horizontal and vertical directions. FIG. 17(iv) shows the case of a c% trimming photographing mode in both the horizontal and vertical directions. FIG. 17(v) shows the case of a trimming photographing mode at 100% in the horizontal direction and at a% in the vertical direction. FIG. 17(vi) shows the case of a trimming photographing mode at 100% in the horizontal direction and at c% in the vertical direction. FIG. 17(vii) shows the case of a trimming photographing mode at b% in the horizontal direction and at 100% in the vertical direction. FIG. 17(viii) shows the case of a trimming photographing mode at c% in the horizontal direction and at a% in the vertical direction. Note that FIGS. 17(i) to 17(iv) show the cases of the normal and trimming photographing modes for providing a telescopic effect by changing a photographing field angle. FIGS. 17(v) to 17(vii) show the cases of the trimming photographing modes for providing a panning effect in the horizontal or vertical direction. FIG. 17(viii) shows the case of another special trimming photographing mode. As can be seen from FIG. 17, the characteristic feature of this embodiment is that a plurality of light-receiving regions of the light-receiving portion 106 and the enlarged printing regions (cross-hatched regions) subjected to trimming photography are set to coincide with each other. Thus, a photometric value which can optimize exposure of the enlarged printing regions can be obtained.

In order to briefly explain a circuit operation when the trimming photographing modes are implemented as shown in FIGS. 17(i) to 17(viii), FIG. 18 summarizes the levels of the output voltages $P_1/\overline{F}$, $P_2/\overline{F}$, $Q_1/\overline{F}$, and $Q_2/\overline{F}$ of the trimming data setting means shown in FIGS. 14 and 15, the output voltage levels of the AND gates 113 to 116 and 124 to 127, and addition of luminance data in the ith row and luminance data in the jth column corresponding to the enabled or disabled states of the analog switches.

As described above, in this embodiment, luminance data of a field region which is determined, based on the trimming data, to be unnecessary during printing is not added to a photometric value. Thus, a photometric arithmetic operation for providing optimal exposure to an enlarged printing frame upon trimming photography can be achieved.

In this embodiment, the split photometric regions (positions of circumscribing lines of regions) are set to coincide (substantially in practice) with an enlarged printing region (positions of circumscribing lines of regions) for trimming photography. Thus, very accurate photometry within the enlarged printing region can be realized.

In the above embodiment, as shown in FIG. 17, the split photometric regions of the light-receiving portions are segmented more than the number of a plurality of types of enlarged printing regions in the trimming photographing mode so as to cope with any enlarged printing region request. However, the split photometric regions may be set in correspondence with the number of enlarged printing regions which can be currently set, as shown in FIG. 19.

Figure 19:
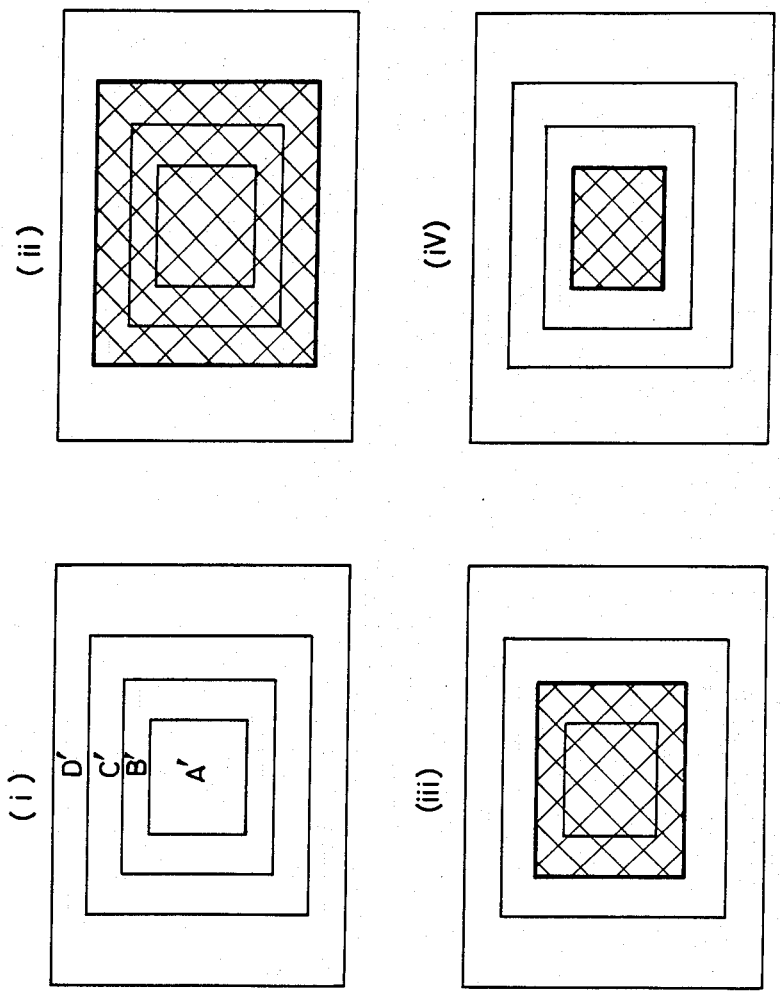
FIG. 19 is a view showing the relationship between an enlarged printing region and a split photometric region in the trimming photographing mode in a split photometric region of a photometric surface according to a fifth embodiment of the present invention.

FIG. 19 shows split photometric regions of the light-receiving portion applied only to the trimming photographing modes corresponding to FIGS. 17(i) to 17(iv). In FIG. 19, four-split photometric regions A' to D' are set. FIG. 19(i) shows the case of the normal photographing mode. In this mode, all the photometric data of the regions A' to D' serve as basic data for calculating a photometric value. An enlarged print region in the trimming photographing mode is indicated by a cross-hatched portion. FIG. 19(ii) shows the case of an a%-trimming photographing mode. In this mode, photometric data of the regions A' to C' serve as basic data for calculating a photometric value. In FIG. 19(iii), photometric data of the regions A' and B' serve as basic data for calculating a photometric value. In FIG. 19(iv), photometric data of only the region A' serves as basic data for obtaining a photometric value.

In the above embodiment, a photometric value calculation is performed to obtain an average value of luminance data of field regions which are not trimmed. Weighting concentrated on the central portion or weighting having an importance on a region other than the central portion may be performed. Statistical processing calculation for calculating an average value between maximum and minimum values of a plurality of photometric values may be performed to obtain a photometric value.

In the above embodiment, the trimming data are two types of data in the horizontal and vertical directions. However, a trimming ratio may be changed in the horizontal or vertical direction.

In the above embodiment, an arithmetic means comprises a logic circuit but may be achieved in a software manner using a microcomputer.

As described above, according to the fourth and fifth embodiments, of luminance data of a plurality of split field regions, luminance data corresponding to field regions which are set not to be enlarged and printed are not used for a photometric value calculation, and split photometric regions are set to substantially coincide with enlarged printing regions. Thus, optimal exposure can be provided to an enlarged printing frame in the trimming photographing mode.

What is claimed is:

1. A photometric device for a pseudo format camera capable of performing trimming photography, comprising:
   (a) trimming data setting means for setting trimming data;
   (b) light-receiving means consisting of a plurality of light-receiving portions for splitting an objective field into a plurality of regions and obtaining luminance data of said plurality of regions; and
   (c) computing means for calculating a photometric value using said plurality of luminance data, said computing means including a correction circuit for substantially correcting luminance data of only a specific region in accordance with said trimming data from said trimming data setting means.

2. A device according to claim 1, wherein said plurality of regions have at least a central region located at the center of the objective field, and an outer region outside said central region.

3. A device according to claim 2, wherein a range of an enlarged printing region of the trimming data set by said trimming data setting means may include a portion of said outer region.

4. A device according to claim 3, wherein when the range of the enlarged printing region of the trimming data set by said trimming data setting means includes the portion of said outer region, said computing means corrects the luminance data of said outer region to be substantially low-weighted, thereby calculating a photometric value.

5. A device according to claim 1, wherein said correction circuit changes a weighting coefficient for each of said plurality of regions in response to said trimming data, so that said computing means calculates a photometric value based on the luminance data of said plurality of regions and said weighting coefficients.

6. A device according to claim 2, wherein, in response to said trimming data, said correction circuit corrects the luminance data of said outer region not to be used for calculation of the photometric value.

7. A device according to claim 2, wherein when said outer region does not include the range of said enlarged printing region of the trimming data set by said trimming data setting means, said correction circuit corrects the luminance data of said outer region not to be used for calculation of the photometric value.

8. A device according to claim 1, wherein said pseudo format camera comprises a single-lens reflex camera incorporating said device.

9. A device according to claim 1, wherein said pseudo format camera comprises a lens shutter camera incorporating said device.

10. A device according to claim 3, wherein said outer region is further divided into a plurality of regions.

11. A device according to claim 2, wherein said central region is further divided into a plurality of regions.

12. A photometric device for a pseudo format camera capable of performing trimming photography, comprising:
   (a) light-receiving means consisting of a plurality of light-receiving portions for splitting an objective field into a plurality of regions and obtaining luminance data of said plurality of regions;
   (b) computing means for calculating a photometric value using said plurality of luminance data; and
   (c) trimming data setting means for setting trimming data so that a range of an enlarged printing region based on said trimming data set by said trimming data setting means is set to substantially coincide with a range of said split regions of said light-receiving means.

13. A device according to claim 12, further comprising:
   a correction circuit for causing ones of said plurality of luminance data, which corresponds to a region other than the enlarged printing region set by said trimming data setting means, not to be used for photometric value calculation in said computing means.

14. A device according to claim 12, wherein said plurality of regions have at least a central region located at the center of the objective field, and an outer region outside said central region.

15. A device according to claim 13, wherein said plurality of regions have at least a central region located at the center of the objective field, and an outer region outside said central region.

16. A device according to claim 14, wherein said outer region is not included in the range of the enlarged printing region based on said trimming data set by said trimming data setting means.

17. A device accodig to claim 15, wherein said outer region is not included in the range of the enlarged printing region based on said trimming data set by said trimming data setting means.

18. A device according to claim 13, wherein said pseudo format camera comprises a single-lens reflex camera incorporating said device.

19. A device according to claim 13, wherein said pseudo format camera comprises a lens shutter camera incorporating said device.

20. A device according to claim 12, wherein said outer region is further divided into a plurality of regions.

21. A device according to claim 12, wherein said central region is further divided into a plurality of regions.

22. A photometric device for a pseudo format camera capable of performing trimming photography, comprising:
   (a) light-receiving means consisting of a plurality of light-receiving portions for splitting an objective field into a plurality of regions and obtaining luminance data of said plurality of regions;
   (b) computing means for calculating a photometric value using said plurality of luminance data; and
   (c) trimming data setting means for setting trimming data so that a boundary of an enlarged printing region based on said trimming data set by said trimming data setting means is set to substantially coincide with a boundary of said split regions of said light-receiving means.

* * * * *

UNITED STATES PATENT AND TRADEMARK OFFICE
CERTIFICATE OF CORRECTION

PATENT NO. : 4,855,780

DATED : August 8, 1989

INVENTOR(S) : Hayakawa

It is certified that error appears in the above-identified patent and that said Letters Patent is hereby corrected as shown below:

Title page:

AFTER [56]:

Add --[30]  Foreign Application Priority Data

May 22, 1987  [JP] Japan...62-123770
July 28, 1987 [JP] Japan...62-189391--.

AT [57]:

"includes," should read --include--.

COLUMN 2:

Line 54, "an" should read --a--.

COLUMN 6:

Line 30, "outputs" should read --output--.

COLUMN 17:

Line 27, change "corresponds" to --correspond--.

UNITED STATES PATENT AND TRADEMARK OFFICE
CERTIFICATE OF CORRECTION

PATENT NO. : 4,855,780

DATED : August 8, 1989

INVENTOR(S) : Hayakawa

It is certified that error appears in the above-identified patent and that said Letters Patent is hereby corrected as shown below:

COLUMN 18:

Line 7, "accoding" should read --according--.

Line 17, "claim 12," should read --claim 14,--. and

Line 20, "claim 12," should read --claim 14,--.

Signed and Sealed this

Seventeenth Day of September, 1991

Attest:

HARRY F. MANBECK, JR.

Attesting Officer

Commissioner of Patents and Trademarks